United States Patent
Gummaraju et al.

(10) Patent No.: US 10,193,963 B2
(45) Date of Patent: Jan. 29, 2019

(54) CONTAINER VIRTUAL MACHINES FOR HADOOP

(71) Applicant: VMware, Inc., Palo Alto, CA (US)

(72) Inventors: Jayanth Gummaraju, San Francisco, CA (US); Richard McDougall, Menlo Park, CA (US); Michael Nelson, Alamo, CA (US); Rean Griffith, Oakland, CA (US); Tariq Magdon-Ismail, San Jose, CA (US); Razvan Cheveresan, Palo Alto, CA (US); Junping Du, Beijing (CN)

(73) Assignee: VMware, Inc., Palo Alto, CA (US)

(*) Notice: Subject to any disclaimer, the term of this patent is extended or adjusted under 35 U.S.C. 154(b) by 964 days.

(21) Appl. No.: 14/062,660

(22) Filed: Oct. 24, 2013

(65) Prior Publication Data
US 2015/0120928 A1 Apr. 30, 2015

(51) Int. Cl.
*H04L 29/08* (2006.01)
*G06F 17/30* (2006.01)
*G06F 9/50* (2006.01)

(52) U.S. Cl.
CPC ........ *H04L 67/1008* (2013.01); *G06F 9/5072* (2013.01); *G06F 17/30194* (2013.01); *G06F 2209/5011* (2013.01)

(58) Field of Classification Search
None
See application file for complete search history.

(56) References Cited

U.S. PATENT DOCUMENTS

| | | | | |
|---|---|---|---|---|
| 8,260,840 B1 * | 9/2012 | Sirota | ................. | G06F 9/5061 370/216 |
| 8,352,608 B1 * | 1/2013 | Keagy | ................. | G06F 8/63 709/226 |
| 8,706,798 B1 * | 4/2014 | Suchter | ................. | G06F 9/5038 709/202 |

(Continued)

OTHER PUBLICATIONS

Jeffrey Dean and Sanjay Ghemawat, "MapReduce: Simplified Data Processing on Large Clusters", In Proceedings of the 6th Symposium on Operating Systems Design & Implementation—vol. 6, OSDI '04, Dec. 6-8, 2004, San Francisco, CA (last changed: Nov. 18, 2004, https://www.usenix.org/legacy/publications/library/proceedings/osdi04/tech/full_papers/dean/dean_html/, 22 pages.

(Continued)

*Primary Examiner* — Nicholas R Taylor
*Assistant Examiner* — Christopher B Robinson
(74) *Attorney, Agent, or Firm* — Patterson & Sheridan, LLP

(57) ABSTRACT

A distributed computing application is described that provides a highly elastic and multi-tenant platform for Hadoop applications and other workloads running in a virtualized environment. Data and compute nodes are separated into different virtual machines (VM). Compute VMs are used to launch containers from different tenants. Compute VMs are organized in pools of hot spare VMs that are immediately available for launching a container and executing a task, and pools of cold spare VMs. Each compute VM may include a mounted network filesystem provided by a node manager to share intermediate outputs across VMs executing on the same host.

17 Claims, 6 Drawing Sheets

(56) References Cited

U.S. PATENT DOCUMENTS

| | | | |
|---|---|---|---|
| 8,904,008 B2* | 12/2014 | Calder | G06F 9/5033 709/226 |
| 2002/0099753 A1* | 7/2002 | Hardin | G06F 1/3203 718/1 |
| 2012/0096165 A1* | 4/2012 | Madduri | G06F 9/5011 709/226 |
| 2012/0102199 A1* | 4/2012 | Hopmann | G06F 9/5044 709/226 |
| 2012/0254434 A1* | 10/2012 | Mehra | G06F 17/30286 709/226 |
| 2012/0297069 A1* | 11/2012 | Duchastel | G06F 9/5077 709/226 |
| 2012/0317579 A1* | 12/2012 | Liu | G06F 9/5072 718/104 |
| 2013/0060946 A1* | 3/2013 | Kenneth | G06F 12/0866 709/226 |
| 2013/0179289 A1* | 7/2013 | Calder | G06Q 30/08 705/26.3 |
| 2013/0179574 A1* | 7/2013 | Calder | G06F 9/5033 709/226 |
| 2013/0179894 A1* | 7/2013 | Calder | G06F 9/5027 718/104 |
| 2013/0227558 A1* | 8/2013 | Du | G06F 9/45558 718/1 |
| 2013/0290953 A1* | 10/2013 | Li | G06F 9/5066 718/1 |
| 2013/0339950 A1* | 12/2013 | Ramarathinam | G06F 9/44505 718/1 |
| 2014/0006580 A1* | 1/2014 | Raghu | G06F 9/5072 709/223 |
| 2014/0215073 A1* | 7/2014 | Dow | H04L 67/10 709/226 |
| 2014/0289733 A1* | 9/2014 | Fritz | G06F 9/5066 718/104 |

OTHER PUBLICATIONS

Jeffrey Buell et al., "A Benchmarking Case Study of Virtualized Hadoop Performance on VMware vSphere 5", Technical White Paper, Oct. 17, 2011, https://www.vmware.com/files/pdf/VMW-Hadoop-Performance-vSphere5.pdf, 17 pages.

Vinod Kumar Vavilapalli, "Apache Hadoop YARN—NodeManager", Sep. 11, 2012, © Hortonworks Inc. 2013, http://hortonworks.com/blog/apache-hadoop-yarn-nodemanager/, 7 pages.

Jeffrey Buell et al., "Virtualized Hadoop Performance with VMware Vsphere 5.1", Technical White Paper, Apr. 9, 2013, http://www.vmware.com/files/pdf/techpaper/hadoop-vsphere51-32hosts.pdf, 20 pages.

"Apache Hadoop NextGen MapReduce—YARN", The Apache Software Foundation, Version 2.2.0, Last Published Oct. 7, 2013, http://hadoop.apache.org/docs/current/hadoop-yarn/hadoop-yarn-site/YARN.html, 2 pages.

"Hadoop MapReduce Next Generation-2.2.0—Writing YARN Applications", The Apache Software Foundation, Version.2.2.0, Last Published Oct. 7, 2013, http://hadoop.apache.org/docs/current/hadoop-yarn/hadoop-yarn-site/WritingYarnApplications.html, 11 pages.

* cited by examiner

CONTAINER VIRTUAL MACHINES FOR HADOOP

BACKGROUND

Distributed computing platforms, such as Hadoop or other MapReduce-related frameworks, include software that allocates computing tasks across a group, or "cluster," of distributed software components executed by a plurality of computing devices, enabling large workloads (e.g., data sets) to be processed in parallel and more quickly than is generally feasible with a single software instance or a single device. Such distributed computing platforms typically utilize a distributed file system that can support input/output-intensive distributed software components running on a large quantity (e.g., on the order of thousands) of computing devices to access a large quantity (e.g., petabytes) of data. For example, a data set to be analyzed by Hadoop may be stored within a Hadoop Distributed File System (HDFS) that is typically used in conjunction with Hadoop, which enables various computing devices running Hadoop software to simultaneously process different portions of the file.

SUMMARY

One or more embodiments disclosed herein provide a method for executing a job comprising a plurality of tasks executed in parallel on a distributed computing application. The method includes generating a list of available virtual machines (VMs) in a powered on state and executing on a first host, and responsive to receiving a request to execute a first task of the plurality of tasks associated with a first tenant on the first host, allocating a first VM from the list of available VMs. The method further includes modifying the first VM to mount a network filesystem shared by VMs executing on the first host and associated with the first tenant. The method includes launching, in the first VM, a container process that executes the first task of the plurality of tasks associated with the first tenant.

Further embodiments of the present disclosure include a non-transitory computer-readable storage medium that includes instructions that enable a processing unit to implement one or more of the methods set forth above or the functions of the computer system set forth above.

DETAILED DESCRIPTION

One or more embodiments disclosed herein provide methods, systems, and computer programs for executing a distributed computing application, such as Hadoop, in a virtualized environment. Data nodes and compute nodes are separated into different virtual machines (VMs) to allow compute nodes to elastically scale based on needs of the distributed computing application. In one embodiment, the distributed computing application may use a resource container model, where resource requests are granted in the form of "containers." When a container of executing a task is allocated on a host, node managers, which manage each host and VMs executing on each host, instantiate a VM on that host to handle the task. Ready VMs for handling tasks are provided from different pools of ready VMs, which can provide different levels of readiness.

Figure 1:
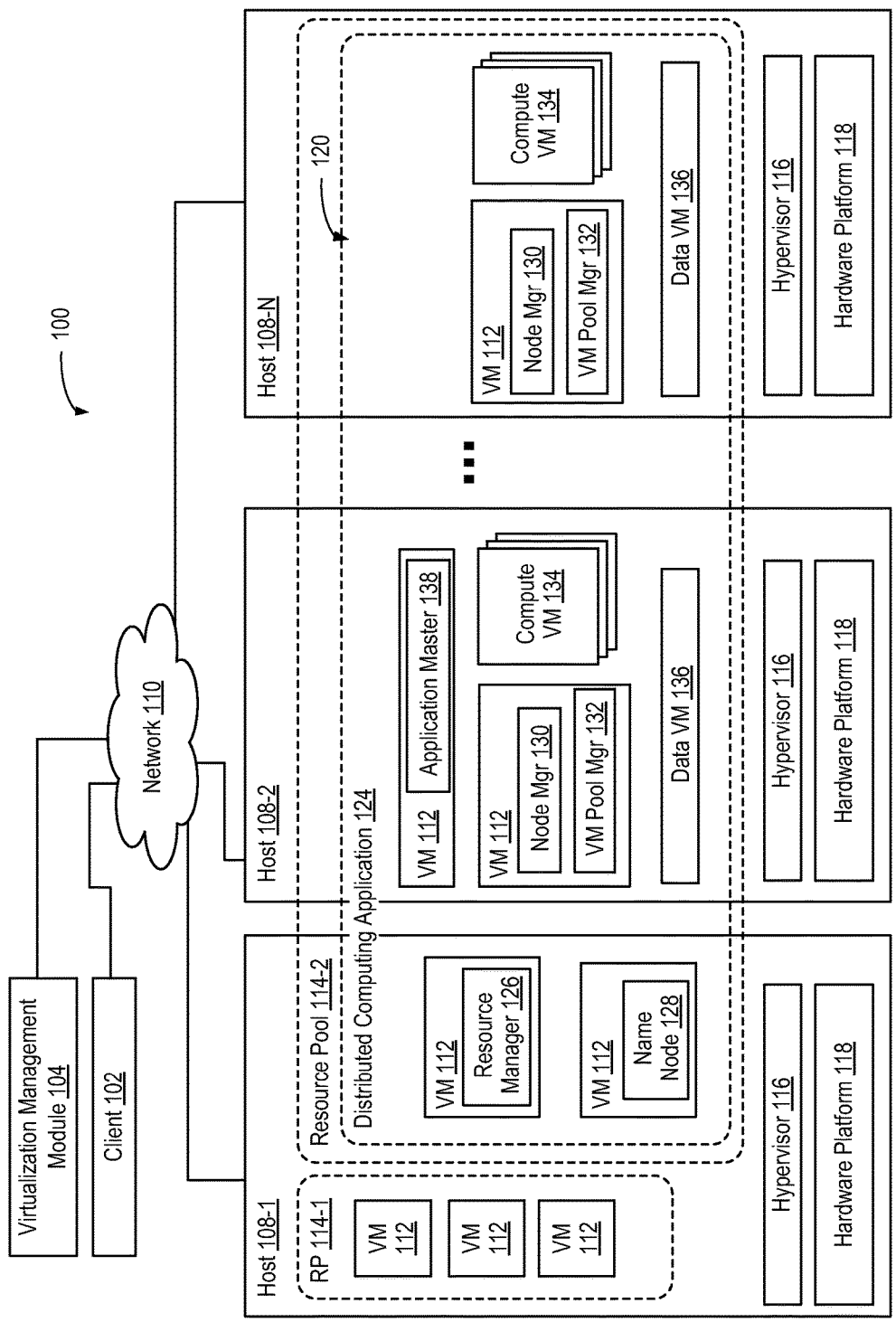
FIG. 1 is a block diagram that illustrates a virtualized computing system with which one or more embodiments of the present disclosure may be utilized.

FIG. 1 is a block diagram that illustrates a computing system 100 with which one or more embodiments of the present disclosure may be utilized. As illustrated, computing system 100 includes a plurality of host computers, identified as hosts 108-1, 108-2, 108-3, and 108-4, and referred to collectively as hosts 108. Each host 108 is configured to provide a virtualization layer that abstracts processor, memory, storage, and networking resources of a hardware platform 118 into multiple virtual machines (VMs) 112 that run concurrently on each of hosts 108. VMs 112 run on top of a software interface layer, referred to herein as a hypervisor 116, that enables sharing of the hardware resources of each of hosts 108 by the VMs 112. One example of hypervisor 116 that may be used in an embodiment described herein is a VMware ESXi hypervisor provided as part of the VMware vSphere solution made commercially available from VMware, Inc.

In one embodiment, VMs 112 may be organized into a plurality of resource pools, identified as resource pools 114-1, 114-2, and 114-3, which logically partition available resources of hardware platforms 118, such as CPU and memory. Resource pools 114 may be grouped into hierarchies; resource pools 114 provide resources to "child" resource pools and virtual machines. Resource pools 114 enable a system administrator to organize resources of computing system 100, isolate VMs and computing resources from one resource pool to another, abstract resources from the actual hosts 108 that contribute the resources, and manage sets of VMs 112 associated with a resource pool 114. For example, a system administrator may control the aggregate allocation of resources available to the set of VMs 112 by changing settings on the VMs' enclosing resource pool 114.

As shown, VMs 112 of hosts 108 may be provisioned and used to execute a number of workloads that deliver information technology services, including web services, database services, data processing services, and directory services. In one embodiment, one or more VMs 112 are configured to serve as a node of a cluster generated and managed by a distributed computing application 124 configured to elastically distribute its workload over a plurality of VMs that act as nodes of the distributed computing application. Distributed computing application 124 may be configured to incorporate additional VMs or release unused VMs from its cluster—thereby growing and shrinking its profile within computing system 100. VMs 112 executing as nodes of distributed computing application 124 are shown in greater detail in FIG. 2.

Figure 2:
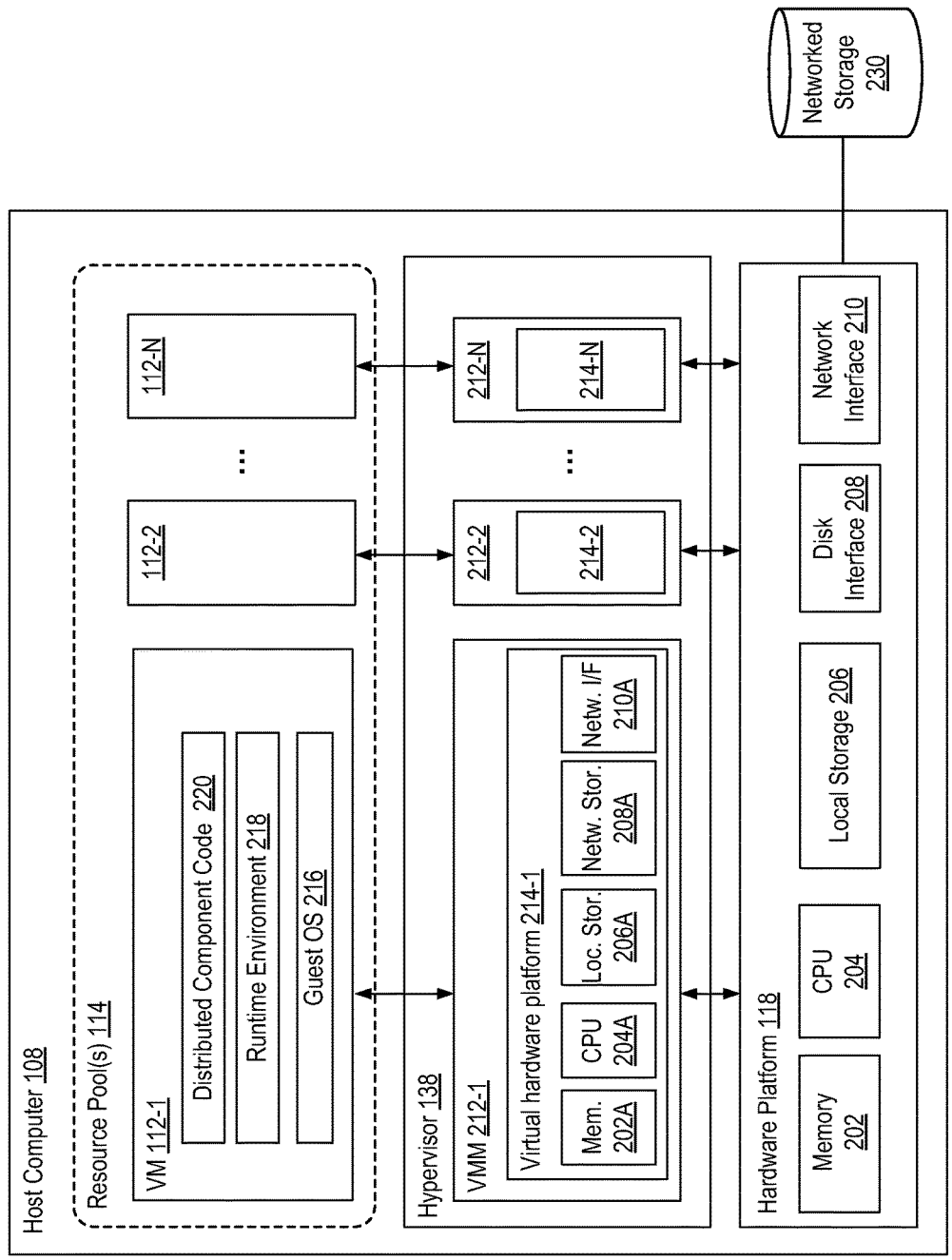
FIG. 2 is a block diagram that illustrates a host computer supporting one or more virtual machines, according to one embodiment of the present disclosure.

FIG. 2 is a block diagram that illustrates a host computer 108 supporting one or more virtual machines 112, according to one embodiment of the present disclosure. As shown, hardware platform 118 of each host 108 may include conventional components of a computing device, such as a memory 202, a processor 204, local storage 206, a disk interface 208, and a network interface 210. Processor 204 is configured to execute instructions, for example, executable instructions that perform one or more operations described herein and may be stored in memory 202 and in local storage 206. Memory 202 and local storage 206 are devices allowing information, such as executable instructions, cryptographic keys, virtual disks, configurations, and other data, to be stored and retrieved. Memory 202 may include, for example, one or more random access memory (RAM) modules; local storage 206 may include, for example, one or more hard disks, flash memory modules, solid state disks, and optical disks. Disk interface 208 enables host 108 to communicate with one or more network data storage systems that may, for example, store "virtual disks" that are accessed by VM nodes. Examples of disk interface 208 are a host bus adapter (HBA) that couples host 108 to a storage area network (SAN) or a network file system interface, depicted as networked storage 230. Network interface 210 enables host 108 to communicate with another device via a communication medium, such as network 110. An example of network interface 210 is a network adapter, also referred to as a Network Interface Card (NIC). In some embodiments, a plurality of NICs is included in network interface 210.

As described earlier, virtual machines (e.g., VMs 112-1 to 112-N) run on top of a hypervisor 116 that enables sharing of the resources of hardware platform 118 of host 108 by the virtual machines. Hypervisor 116 may run on top of the operating system of host 108 or directly on hardware components of host 108. Hypervisor 116 provides a device driver layer configured to map physical resource of hardware platforms 118 to "virtual" resources of each VM 112 such that each VM 112-1 to 112-N has its own corresponding virtual hardware platform (e.g., a corresponding one of virtual hardware platforms 214-1 to 214-N). Each such virtual hardware platform 214 provides emulated hardware (e.g., memory 202A, processor 204A, local storage 206A, networked storage 208A, network interface 210A, etc.) that may, for example, function as an equivalent, conventional hardware architecture for its corresponding VM 112. Virtual hardware platforms 214-1 to 214-N may be considered part of virtual machine monitors (VMMs) 212-1 to 212-N which implement virtual system support to coordinate operations between hypervisor 116 and corresponding VMs 112-1 to 112-N. In the embodiment depicted in FIG. 2, each VM 112 includes a guest operating system (OS) 216 (e.g., Microsoft Windows, Linux) and one or more guest applications running on top of guest OS 216. In one embodiment, each VM 112 includes a runtime environment 218, such as a Java Virtual Machine (JVM), that supports execution of a distributed software component code 220 (e.g., Java code) for distributed computing application 124. For example, if distributed computing application 124 is a Hadoop application, a VM 112 may have a runtime environment 218 (e.g., JVM) that executes distributed software component code 220 implementing a "Resource Manager" function, "Application Master" function, "Node Manager" function, "Container" function, "Name Node" function, "Data Node" function, "VM Pool Manager" function, and other functions, described further below. Alternatively, each VM 112 may include distributed software component code 220 for distributed computing application 124 configured to run natively on top of guest OS 216.

Referring back to FIG. 1, computing system 100 includes a virtualization management module 104 that may communicate to the plurality of hosts 108 via network 110. In one embodiment, virtualization management module 104 is a computer program that resides and executes in a central server, which may reside in computing system 100, or alternatively, running as a VM in one of hosts 108. One example of a virtualization management module is the vCenter® Server product made available from VMware, Inc. Virtualization management module 104 is configured to carry out administrative tasks for the computing system 100, including managing hosts 108, managing VMs running within each host 108, provisioning VMs, migrating VMs from one host to another host, load balancing between hosts 108, creating resource pools 114 comprised of computing resources of hosts 108 and VMs 112, modifying resource pools 114 to allocate and de-allocate VMs and physical resources, and modifying configurations of resource pools 114. In one embodiment, virtualization management module 104 may issue commands to power on, power off, reset, clone, deploy, and provision one or more VMs 112 executing on a particular host 108. In one embodiment, virtualization management module 104 is configured to communicate with hosts 108 to collect performance data and generate performance metrics (e.g., counters, statistics) related to availability, status, and performance of hosts 108, VMs 112, and resource pools 114.

In one embodiment, distributed computing application 124 may be an implementation of the MapReduce model, which is a distributed processing framework popular for large-scale data processing. Computations, referred to as jobs, are broken into tasks that run in two phases—Map and Reduce. During the Map Phase (Map) tasks read data from a distributed file system (in parallel) and perform their computations in parallel. At the end of the Map phase, the intermediate output (results of the computations) generated locally are sent to the Reduce phase (potentially remote) for aggregation or further processing, before the final results are written to the distributed file system. Map tasks generally involve processing a small subset of a larger input data, such as filtering and sorting portions of a data set, or solving a sub-problem broken off from the input data, while Reduce tasks generally perform a summary operation that collects the answers to sub-problems and combines them in some manner to generate an output. Hadoop is an open-source implementation of the MapReduce model, and may rely on a Hadoop Distributed File System (HDFS) for data storage of the input dataset and the resulting output. Traditional implementations of Hadoop, often referred to as MapReduce Version 1, or "MR1," include several distinguishable components, including a Name Node component, which manages HDFS and file metadata, a Data Node component, which store HDFS data, a Task Tracker component, which runs Map and Reduce tasks on nodes, and a Job Tracker component, which farms out tasks to Task Trackers.

According to one embodiment, distributed computing application 124 may be a Hadoop application configured according to a next generation framework, referred to as Hadoop YARN, which supports arbitrary distributed processing frameworks. YARN provides a collection of daemons and components that are responsible for handling resource requests from processing frameworks, resource acquisition, and scheduling. The distributed processing frameworks are then free to use the resources granted as each processing framework sees fit.

Distributed computing application 124 includes a resource manager 126, a plurality of node managers 130, and at least one application master 138. Resource manager 126, also referred to as a Hadoop Resource Manager (HRM), may be configured to accept jobs from clients (e.g., client 102) and manage resources for executing workloads within one or more nodes of distributed computing application 124. Application master 138 may be a framework-specific library configured to negotiate resources from resource manager 126 and work with one or more node managers 130 to schedule and execute tasks using the negotiated resources. Each job (sometimes referred to as an "application") can have its own instance of an application master 138, where a global resource manager 126 arbitrates between the application masters. Individual application masters 138 allow for better isolation, and distributed computing application 124 provides a general resource allocation framework that allows multiple frameworks to share underlying cluster resources.

In one embodiment, distributed computing application 124 uses a resource container module where frameworks make resource requests and, once granted in the form of "containers," can be used for any task desired. This leads to a more flexible resource usage model, and work-conserving resource usage that avoids a mismatch between available cluster resources and the resources required by a workload. Resource containers also provide isolation across multiple tenants as a result of policies used by a scheduler of resource manager 126 to allocate resources to different frameworks, applications, and tenants. As used herein, a container refers to a resource allocation that is the result of resource manager 126 granting a specific resource request from an application master 138. In other words, a container grants a right to application master 138 to use a specific amount of computing resources (e.g., CPU, memory, etc.) on a particular host 108 to execute tasks of a job. Application master 138 requests a node manager 130 to launch a container on the host that the node manager is managing.

In one embodiment, each node manager 130 (e.g., executing on a VM 112 on a host 108) is configured to launch one or more compute VMs 134 as containers, manage compute VMs 134 executing on that host, monitor resource usage (e.g., CPU, memory, disk, network) of each compute VM 134, and report resource usage and performance metrics to resource manager 126. By executing in a VM 112 that is separate from compute VMs 134 launched as containers, node manager 130 may be maintained as an infrastructure component of distributed computing application 124 separate from tenant-specific execution engines (i.e., compute VMs). As such, even when tenant-specific deployments might be scaled up or down (e.g., by powering on and off compute VMs) to support an elastic multi-tenant environment, node manager 130 remains powered on and available, for example, to serve map outputs to Reduce tasks. Similar to the separation of compute nodes and data nodes described above, this separation between node manager 130 and compute nodes allows for better elasticity of the compute substrate. In the embodiment shown, computing system 100 includes one node manager 130 executing on each host 108, i.e., a single node manager 130 per host, although other arrangements may be used. At launch of distributed computing application 124, node manager 130 may provision (e.g., via virtualization management module 104) a set of pre-registered compute VMs 134 on each host 108.

Each node manager 130 may be configured to export one or more directories within local storage 206 via a network filesystem to all compute VMs 134 executing on the host managed by node manager 130. This network filesystem may be used to store intermediate outputs and other data generated during operation of distributed computing application 124, and allows node manager 130 and compute VMs to act as if the node manager and compute VMs are all using the same local filesystem, as in a conventional Hadoop physical deployment. In one embodiment, node manager 130 is configured to provide a web server that is used to serve intermediate output to tasks, such as serving Map outputs to Reduce tasks. As such, having node manager 130 and compute VMs 134 share an NFS-mounted filesystem allows node manager 130 access to Map outputs even though multiple, different compute VMs 134 may be used to run Map tasks and Reduce tasks.

Distributed computing application 124 may use a distributed file system, such as HDFS, comprising a name node 128 configured to track where data is located within storage resources of hosts 108, including local storage 206 and networked storage 230, which are accessible via a plurality of data nodes, or data VMs 136. Each data VM 136 acts as a conduit to fetch data from the underlying HDFS storage, which can be on any of the storage mediums (e.g., local storage 206, networked storage 230) described above. In one or more embodiments, each host 108 may include a separate data VM 136 and a plurality of compute VMs 134. In contrast to traditional implementations of Hadoop where each node is a combined data and compute node, this separation of compute and data VMs enables embodiments described herein to elastically scale Hadoop clusters as compute VMs 134 may be powered on and off without affecting HDFS. Accordingly, embodiments described herein advantageously provide efficient multi-tenancy and improved resource utilization. Further, while physical deployments of Hadoop can be modified to separate data and compute nodes, separating data and compute nodes may result in some machines being fully dedicated for compute and others fully dedicated for storage, which in turn leads to under-utilization of resources. Although some operation system-level virtualization techniques, such as Linux containers, can address some of these issues, operation system-level virtualization cannot guarantee the performance and security isolation that VMs provide to effectively support multi-tenancy. Accordingly, in embodiments of distributed computing application 124 running on a virtualized environment such as computing system 100, compute VMs 134 and data VMs 136 can be deployed on a same host 108, providing the ability to share the underlying hardware resources while allowing true multi-tenancy and elasticity.

As mentioned above, each compute VM 134 is a worker node that carries out requested tasks (e.g., map tasks, reduce tasks) provided by a node manager 130, e.g., a node manager 130 executing on the same host 108. As described later, a pool of "hot spare" compute VMs 134 may be maintained in a powered on state so that such compute VMs may start executing tasks immediately upon request. In one implementation, a compute VM 134 may execute a task by launching an instance of a runtime environment (e.g., Java Virtual Machine) executing distributed software component code 220 that executes the task.

Each node manager 130 may include a VM pool manager 132 configured to provide the corresponding node manager 130 with ready VMs 112 to launch the compute containers. VM pool manager 132 is configured to interact with virtualization management module 104 to query an inventory of components within in computing system 100 managed by virtualization management module 104 and generate a list of all compute VMs on each host 108. In one embodiment, at launch, VM pool manager 132 may establish a persistent connection to virtualization management module 104, which VM pool manager 132 uses to issue power on, power off, and reset requests for compute VMs executing on the host and tracked by VM pool manager 132. VM pool manager 132 may be further configured to query tenant-specific resource pool information from virtualization management module 104, which may be used to enforce tenant-specific resource limits while allocating compute VMs.

In one embodiment, VM pool manager 132 may maintain numerous lists of the compute VMs to track their status and availability according to techniques described herein. In some embodiments, VM pool manager 132 may maintain an active list of compute VMs that have been allocated to a node manager for executing a task; a list of "hot spare" VMs, which are available compute VMs 134 provisioned for distributed computing application 124 and maintained in a powered on state; and a list of "cold spare" VMs, which are available compute VMs 134 that have already been provisioned for distributed computing application 124 but are in a powered off state. In some embodiments, the list of "hot spare" VMs may include a list of tenant-specific hot spares, and a list of "pristine" hot spares, as described later in conjunction with FIG. 5.

In one embodiment, a compute VM 134 may be a "lightweight" VM configured to instantiate quickly relative to conventional VMs. In some embodiments, each compute VM 134 may include a content-based read cache (CBRC) that is used to store a boot image of the compute VM in memory. The CBRC uses a RAM-based configured to cache disk blocks of a virtual machine disk file (VMDK), and serve I/O requests from the CBRC-enabled virtual machine. In one embodiment, the compute VMs may be created as linked clones from a common parent that has a substantial portion of the boot image stored in the CBRC. In this way, only one copy of the "common" boot image in the content-based read cache across multiple compute VMs. An example of content-based read cache may be found in the vSphere 5.0 product made commercially available by VMware, Inc. In some embodiments, each compute VM 134 may be configured to optimize a boot loader used to start each compute VM (i.e., GNU GRUB), and remove extraneous services and devices that might be found in conventional VMs, but are not related to or needed for launching containers. These optimized compute VM 134 configurations may reduce the time needed to ready a compute VM (i.e., boot and power on), from about 30 seconds to under 3 seconds.

Figure 3:
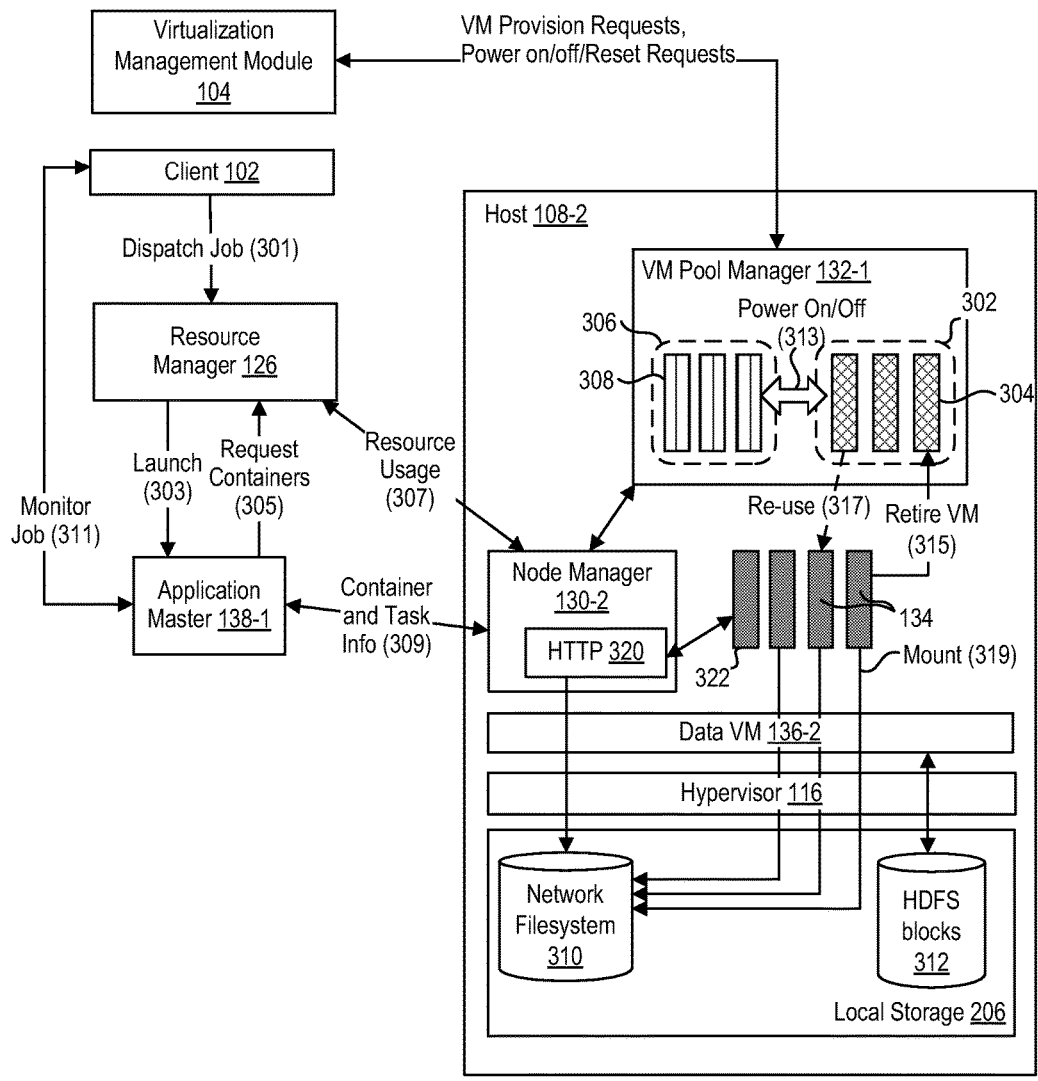
FIG. 3 is a block diagram that illustrates operations of a distributed computing application executing on virtualized computing system, according to one embodiment of the present disclosure.

FIG. 3 is a block diagram that illustrates operations of distributed computing application 124 executing on virtualized computing system 100, according to one embodiment of the present disclosure. In operation, at 301, a client 102 may dispatch a job to resource manager 126, which breaks up the job into parallel tasks to be executed on different shards of data (i.e., InputSplits) stored within data VMs 136. At 303, resource manager 126 may launch a job-specific application master 138-1 based on data specified by the job request.

At 305, application master 138-1 negotiates with resource manager 126 for one or more resource containers for executing the job. In one embodiment, application master 138 can ask for a set of containers to run its tasks on based on one or more task requirements. For example, application master 138 may request for a specified number of containers having a specified resource capability, such as a requested memory allocation (e.g., 2 GB), and specified request priority.

In response, resource manager 126 may allocate a set of resource containers based on cluster capacity, priorities, and scheduling policy. In one embodiment, resource manager 126 allocates containers based on scheduling factors and information obtained from node managers 130 (at 307) and name node 128, including what resources are available, the availability of those resources on a per-host basis, and data locality of data stored in data VMs 136. For example, resource manager 126 may allocate containers for executing a task on host 108-2 based on block information (obtained from name node 128) that indicates input data (e.g., HDFS blocks 312) for that task is located at a data VM 136-2 executing on host 108-2. Resource manager 126 may return an allocation response to application master 138-1 that includes information about the containers allocated to application master 138-1, such as container identifiers, node identifiers, and network information for contacting node managers 130 on hosts 108 that can launch the allocated containers.

Upon successfully obtaining a set of containers, at 309, application master 138-1 provides container launch specification information to node managers 130, which handles launching of the containers. Application master 138-1 may monitor progress of launched containers via communications with each node manager 130 (at 311).

According to one embodiment, node manager 130 launches a container in a compute VM 134 obtained from a pool 302 of hot spare VMs 304 maintained by VM pool manager 132 (at 317). For example, when a task arrives at a host 108-2, VM pool manager 132 allocates one of the hot spare VMs 304 for execution of this task. In one embodiment, VM pool manager 132 may power on one or more compute VM from a pool 306 of cold spare VMs 308 to replenish pool 302-2 of hot spare VMs 304 (e.g., at 313). Once the task completes, the allocated compute VM may be powered off and returned to pool 306 of cold spare VMs 308 (e.g., at 313), or, alternatively, reset and put back into pool 302 of hot spare VMs (at 315). In some embodiments, the returned compute VM may be put back into pool 302 depending on a target pool size that specifies threshold number of hot spare VMs 304.

According to one embodiment, each compute VM 134 may be configured to mount (e.g., at 319) a network filesystem 310 (e.g., Network File System, or NFS) exported by a node manager 130 executing on the same host 108. As mentioned above, a node manager 130 may run a web server 320 that is used to serve up intermediate outputs to tasks, such as Map outputs to Reduce tasks. Such intermediate outputs are traditionally stored in areas of local storage 206 of the local host, rather than stored and accessed through HDFS (which might ultimately be stored in local storage of other hosts). The use of the NFS-mounted filesystem 310 allows tasks to execute in different compute VMs 134, but still share the common files, e.g., intermediate Map outputs, with node manager 130 so that the common files may be provided to other compute VMs (e.g., via web server 320). For example, compute VMs executing Reduce tasks (e.g., VM 322) may access web server 320 run by node manager 130-2 to obtain intermediate outputs in network filesystem 310 (e.g., via http:// requests).

Figure 4:
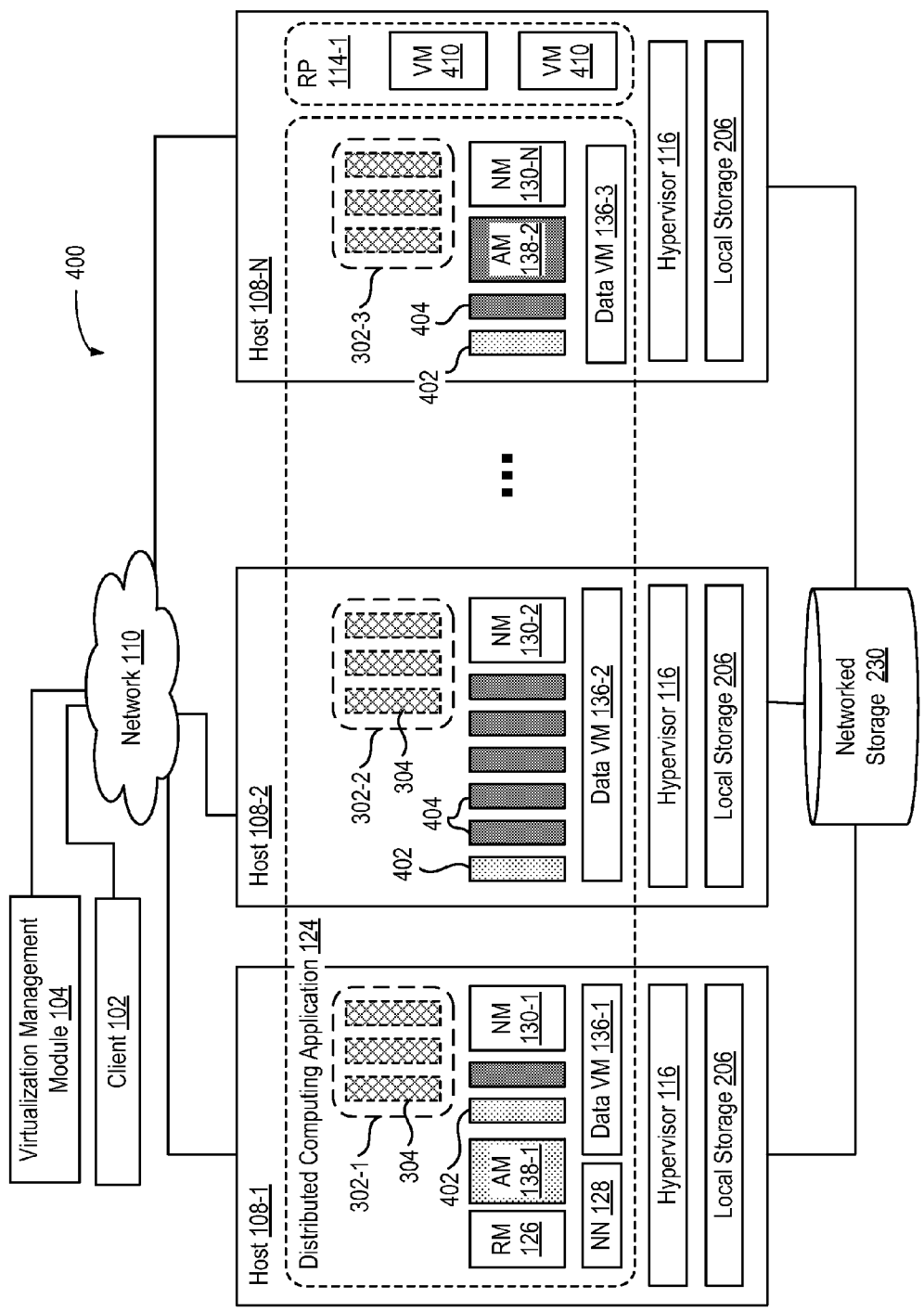
FIG. 4 is a block diagram that depicts a distributed computing application having compute VMs from different tenants executing simultaneously within the virtualized computing system of FIG. 1, according to an embodiment of the present disclosure.

FIG. 4 depicts compute VMs 134 from different tenants executing simultaneously within computing system 400. To illustrate multi-tenancy, compute VMs and application masters associated with a particular tenant depicted with like shading. As shown in FIG. 4, a first application master 138-1 associated with a first tenant uses a group of compute VMs 402 for performing tasks of a first job. The group of compute VMs 402 associated with the first tenant may be executing on different hosts 108, specifically, hosts 108-1, 108-2, and 108-N. A second application master 138-2 associated with another, second tenant uses a separate group of compute VMs 404 for performing tasks of a second job. The second group of compute VMs 404 associated with the second tenant are also executing on different hosts 108, but may further be executing on the same hosts as the first group of compute VMs 402. In operation, when a task for a particular tenant arrives at a host 108-1, node manager 130-1 managing host 108-1 satisfies the request by launching a container using a ready VM from pool 302-1 of hot spare VMs 304 executing on host 108-1. Similarly, when a task arrives at a host 108-2 for execution, node manager 130-2 managing host 108-1 allocates a ready VM for launching a container from pool 302-2 of hot spare VMs 304 executing on host 108-2. As such, during operation, the first and second groups of compute VMs 402, 404 may grow and shrink dynamically based on needs of the corresponding job executing on the separate groups of compute VMs. For example, as shown in FIG. 4, node manager 130-2 executing on host 108-2 has allocated five compute VMs 404 for executing tasks associated with the second tenant, compared to one compute VM 402 for executing tasks associated with the first tenant.

Figure 5:
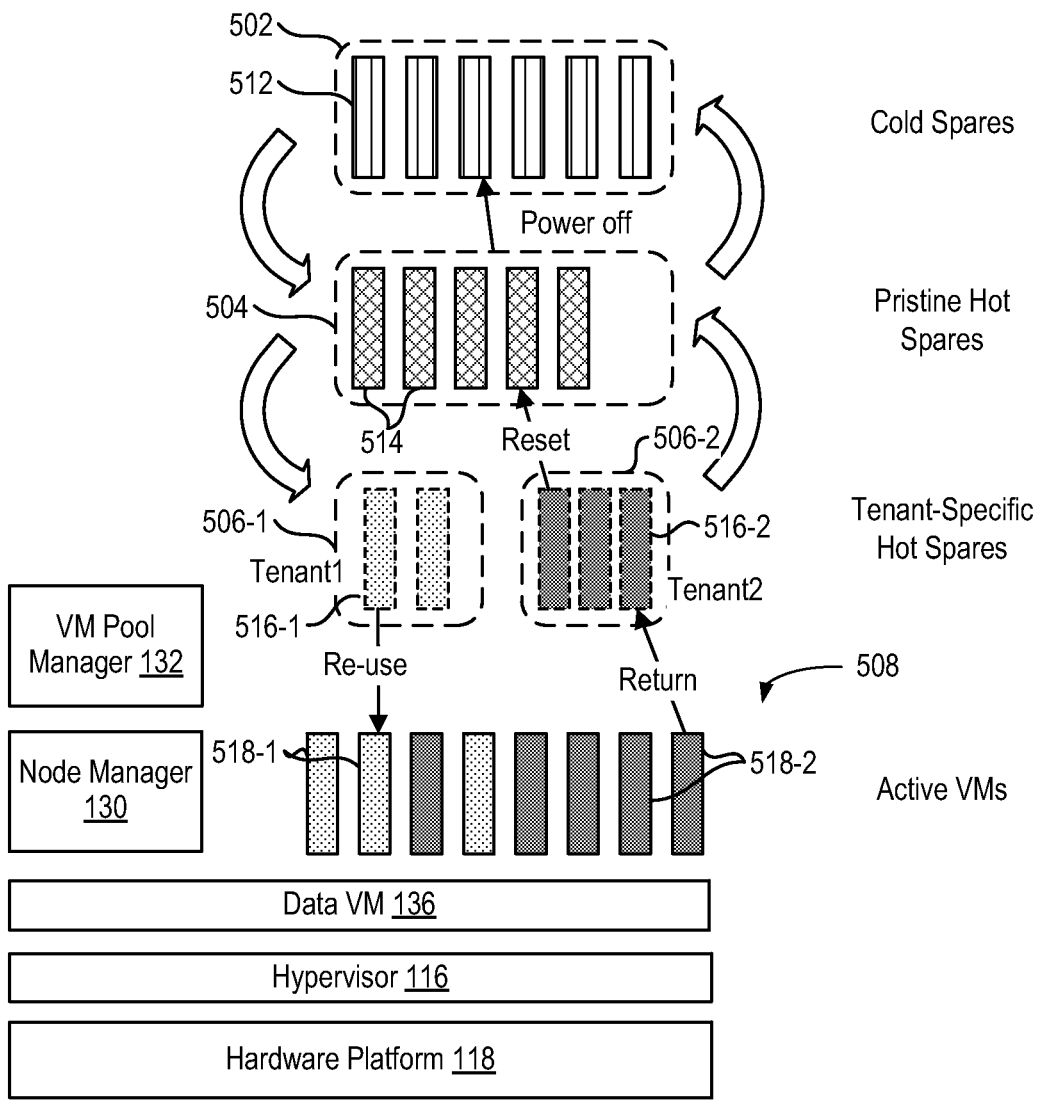
FIG. 5 is a block diagram depicting lists maintained to track state of compute VMs of the distributed computing application, according to embodiments of the present disclosure.

While the embodiment shown depicts the different tenants using VMs from the same hot spare pool 302 to execute tasks, in other embodiments, to better support isolation between tenants, pools 302 of VMs can be tenant-specific and the hot spare VMs can be maintained on a per-tenant basis, as shown in FIG. 5. Furthermore, while the embodiment shown in FIG. 4 depict distributed computing application as a Hadoop application configured to process a large set of data using a distributed set of workload nodes (e.g., VMs 112) allocated to the Hadoop application, it should be recognized that alternative architectures for a Hadoop deployment may be utilized with the techniques described herein. It should be further recognized that, while embodiments of present disclosure are described in terms of a Hadoop deployment, other distributed computing applications or frameworks, such as large scalable database systems (e.g., MongoDB, Apache Cassandra), may be configured and utilized according to the techniques provided herein.

FIG. 5 depicts a plurality of lists maintained by VM pool manager 132 to track state of compute VMs, according to one embodiment of the present disclosure. As shown, in one embodiment, VM pool manager 132 may maintain a pool 502 of cold spare VMs, a pool 504 of "pristine" hot spare VMs, pools 506 (e.g., 506-1, 506-2) of tenant-specific hot spare VMs, and a pool 508 of active VMs. As mentioned above, cold spare VMs 512 refer to compute VMs 134 that have been provisioned for use by distributed computing application 124, but are maintained in a powered off state.

"Pristine" hot spare VMs 514 refer to compute VMs 134 that are running (i.e., maintained in a powered on state) and have been reset to remove tenant-specific state and other information from the compute VM. It should be recognized that pristine hot spare VMs 514 have also been previously used to execute tasks for a particular tenant, and the reset operation cleans up the compute VMs prior to making the compute VMs available for use by other tenants. As such, embodiments described herein avoid data leaks across tenants and provided greater guarantees of security isolation across tenants. Further, reset operations performed on compute VMs provide a mechanism to rapidly release resources (e.g., memory) that were consumed by a compute VM and make those resources immediately available to other VMs executing on the host. Moreover, the repeated powering on, powering off, and reset operations performed on compute VMs may stress different aspects of the virtualized computing system 100.

Tenant-specific hot spare VMs 516-1, 516-2 (collective referred to as 516) refer to compute VMs 134 that are running (i.e., maintained in a powered on state) and may have been previously used to execute tasks for a particular tenant, or are otherwise associated with a particular tenant. For example, pool 506-1 of tenant-specific hot spare VMs 516-1 are dedicated to a first tenant (identified as "Tenant1"). As such, a request to execute a task for Tenant1 may be satisfied using a tenant-specific hot spare VM 516-1 from pool 506-1. Similarly, a request to execute a task for Tenant2 may be satisfied by allocating a hot spare VM 516-2 from pool 506-2 associated with Tenant2.

In one embodiment, when VM pool manager 132 receives a request from node manager 130 to allocate a compute VM 134 for a task associated with a particular tenant, VM pool manager 132 removes a compute VM from a tenant-specific hot spare pool 506 to active pool 508. If there are no tenant-specific hot spare VMs available, VM pool manager 132 may serve the request from pristine hot spares pool 504, failing which, the request is served from cold spares pool 502 by powering on a cold spare VM 512. Once the task completes, VM pool manager 132 may move the compute VM back to pool 506 of tenant-specific hot spare VMs associated with the tenant of the now-completed task. In some embodiments, VM pool manager 132 may reset the compute VM to remove any tenant-specific state and move the compute VM to pool 504 of pristine hot spare VMs.

In one implementation, VM pool manager 132 may execute a thread, e.g., in the background, that maintains the number of hot spare VMs at a specified threshold by performing VM power management operations that move compute VMs back and forth from pools 502 of cold spare VMs and pools 504, 506 of hot spare VMs. For example, VM pool manager 132 may power off surplus hot spare VMs and move these compute VMs to pool 502 of cold spares to reduce the number of hot spare VMs below the threshold value. Similarly, VM pool manager 132 may power on compute VMs from pool 502 of cold spares and move these compute VMs to pool 504 of pristine hot spares. In some embodiments, separate threshold values for pristine hot spare VMs and for tenant-specific hot spare VMs, as well as an aggregate threshold value for all hot spare VMs (i.e., including both pristine and tenant-specific hot spare VMs) may be maintained. In some embodiments, threshold values associated with a particular tenant may be configured to maintain a number of tenant-specific hot spare VMs associated with the tenant.

Figure 6:
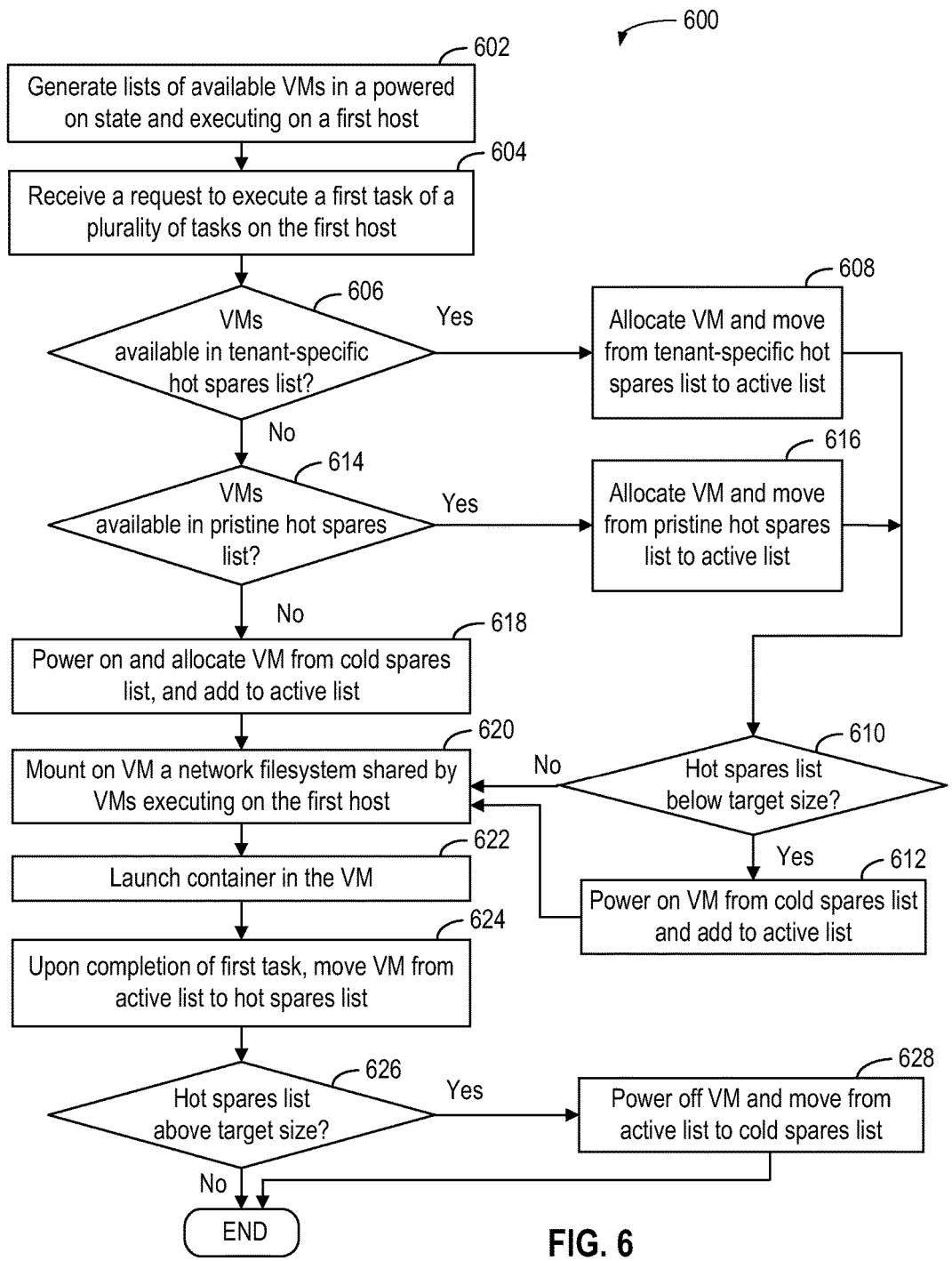
FIG. 6 is a flow diagram that illustrates steps for a method of executing a distributed computing application within a virtualized environment, according to an embodiment of the present disclosure

FIG. 6 is a flow diagram that illustrates steps for a method 600 of executing a distributed computing application within a virtualized environment, according to an embodiment of the present disclosure. It should be recognized that, even though the method is described in conjunction with the system of FIGS. 1, 2, and 3, any system configured to perform the method steps is within the scope of embodiments of the disclosure.

At step 602, VM pool manager 132 generates a hot spares list comprising a list of available VMs in a powered on state and executing on the host managed by VM pool manager 132. In some embodiments, the hot spares list may include (1) a tenant-specific hot spares list for each tenant that includes compute VMs associated with the corresponding tenant, and (2) a pristine hot spares list of available compute VMs in a powered on state that have been reset to clean any tenant-specific state from the compute VM.

In one embodiment, a plurality of VMs may have been provisioned on each host when distributed computing application 124 was deployed. In other embodiments, VM pool manager 132 may dynamically provision (e.g., via API call to virtualization management module 104) the plurality of VMs at launch of distributed computing application 124. In either embodiment, VM pool manager 132 may power on a subset of the provisioned VMs based on a target pool size. The target pool size specifies threshold values for managing compute VMs 134 using power-on, power-off, and reset operations. In one embodiment, VM pool manager 132 powers on provisioned VMs until the target pool size is reached.

At step 604, node manager 130 receives a request to execute a first task of a plurality of tasks on the first host. As described above, a job may be broken down into a plurality of tasks that can be executed in parallel. In one embodiment, an application master 138, having been allocated containers by resource manager 126, may transmit (e.g., via API call) a container launch request to node manager 130 to launch a container that executes one or more tasks from the plurality of tasks. The container launch request may contain information needed by node manager 130 to launch a container including, but not limited to, a container identifier, a tenant identifier for whom the container is allocated, and security tokens used for authenticating the container. In one embodiment, the container launch request may be configured to launch a process that executes the task, and may include one or more commands (e.g., command line) to launch the container, initialize environment variables and configure local resources needed for running the container (e.g., binaries, shared objects, side files, libraries, Java archive files or JAR files).

According to one embodiment, rather than launching a process for the container within the same node as performed in conventional deployments, node manager 130 allocates compute VMs 134 from VM pool manager 132 and launches the container within one of these compute VMs 134. Responsive to receiving the request, node manager 130 allocates a first VM from the list of available VMs (i.e., generated in step 602).

In one embodiment, at step 606, VM pool manager 132 determines whether any VMs are available in the tenant-specific hot spares list associated with the tenant for whom the container is allocated. The tenant-specific hot spares list includes available VMs in a powered on state and associated with the tenant. If so, at step 608, VM pool manager 132 allocates a first VM from the pool of tenant-specific hot spare VMs. In one embodiment, VM pool manager 132 may remove a VM from tenant-specific hot spares list and add that VM to the active list of compute VMs 134 in active use.

At step 610, VM pool manager 132 checks whether the hot spares list is less than a target pool size. If so, at step 612, VM pool manager 132 may power on one or more compute VMs that had been provisioned to execute on the host based on the deficit of the target pool size, and add the powered-on compute VMs to the hot spares list of available VMs. In one embodiment, VM pool manager may issue a power-on request (e.g., via API call to virtualization management module 104) to power on a number of computes VMs sufficient to reach the target pool size. It should be recognized that the operations of steps 610-612 may be performed periodically, or responsive to any change in the lists, by a thread running in the background.

Responsive to determining that insufficient VMs are available in the tenant-specific hot spares list to satisfy the received request, at step 614, VM pool manager 132 determines whether any VMs are available in a pristine hot spares list of available VMs that are in a powered on state and that have been reset subsequent to a previous task execution. If so, at step 616, VM pool manager 132 allocates the first VM from the pristine hot spares list of available VMs. In one embodiment, VM pool manager 132 may remove a VM from the pristine hot spares list and add that VM to the active list of compute VMs in use. In one embodiment, VM pool manager 132 may proceed to steps 610 and 612 to replenish the pool of pristine hot spare VMs, if necessary, as described above.

Responsive to determining that insufficient VMs are available in the pristine hot spares list to satisfy the received request, at step 618, VM pool manager 132 powers on a VM from the pool of provisioned VMs in a powered off state (i.e., cold spares pool 502). In one embodiment, VM pool manager 132 issues a power-on request (e.g., via API call to virtualization management module 104) to power on a VM from the cold spares list, and moves the powered-on VM from the cold spares list to the active list of VMs in use. It should be recognized that embodiments described herein are not limited to allocating a single VM for a container launch request, and that multiple VMs may be allocated in numbers sufficient to satisfy the received request. Further, compute VMs may be allocated all from the same pool, or from different pools. For example, a container launch request may be first satisfied as much as possible from compute VMs in the tenant-specific and pristine hot spares pools, and then the remainder of compute VMs may be allocated from the pool of cold spares VMs.

At step 620, node manager 130 modifies the first VM to mount a network filesystem shared by VMs executing on the first host and associated with the first tenant. In one embodiment, a network filesystem (e.g., NFS) provided by node manager 130 may be mounted within the first VM at a mount point associated with the first tenant. The common mount point enables the first VM to write intermediate output resulting from executing the first task to the network filesystem, or in some embodiments, to read intermediate output generated by other VMs needed for executing the first task. For example, where the first task may be a Map task, a container (e.g., executing as a compute VM) may generate intermediate output based on execution of the Map task and the container may store the intermediate output results in the mounted network filesystem associated with the first tenant. Subsequently, to execute a Reduce task, a second compute VM may be allocated and configured to receive intermediate map output from multiple node managers 130 executing on different hosts 108, for example, via web request (e.g., over http://), for executing the Reduce tasks. By using NFS, each node manager 130 has access to the intermediate output generated by the compute VMs launched by that node manager, which is then exposed by, for example, a web server. In an alternative embodiment, the second compute VM may be modified to mount the network filesystem associated with the first tenant, and read the intermediate output results directly from the mounted network filesystem to execute the Reduce task.

At step 622, node manager 130 launches, in the first VM, a container process that executes the first task of the plurality of tasks associated with the first tenant. In one implementation, node manager 130 accesses the first VM (e.g., via remote login, such as Secure Shell (SSH), terminal services, and other services) and launches the process corresponding to the execution of the task, such as a runtime environment 218 (e.g., JVM) that executes application code (e.g., distributed component code 220) within the compute VM. The launched process may handle execution of the assigned task, and provide information (e.g., progress, status) back to application master 138 via an application-specific protocol.

At step 624, node manager 130 detects completion of the first task, and may transmit an indication of task completion to VM pool manager 132 to cause VM pool manager 132 to retire the compute VM in which the first task was completed. Also at step 624, upon completion of the first task executing within the first VM, VM pool manager 132 may move the first VM from the active list to the hot spares list of available VMs in a powered on state and executing on the first host. In some embodiments, VM pool manager 132 may add the first VM to the tenant-specific list of available VMs associated with the tenant for which the task is executed. In other embodiments, subsequent to execution of the first task on the first VM, VM pool manager 132 may perform a reset operation on the first VM that removes tenant-specific state from the first VM prior to make the first VM available to other tenants, and add the first VM to the pristine hot spares list of available VMs that have been reset subsequent to executing a task.

In one embodiment, at step 626, VM pool manager 132 checks whether the hot spares list of available VMs is greater than the target pool size. If so, at step 628, VM pool manager 132 may power off (e.g., via API call to virtualization management module 104) one or more VM in the hot spares list and move the powered-off VMs to the cold spares list. As with steps 610-612, it should be recognized that the operations of steps 626-628 may be performed periodically, or responsive to any change in the lists, by a thread of VM pool manager 132 running in the background.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

The various embodiments described herein may employ various computer-implemented operations involving data stored in computer systems. For example, these operations may require physical manipulation of physical quantities which usually, though not necessarily, take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the description provided herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like. One or more embodiments of the present invention may be implemented as one or more computer programs or as one or more computer program modules embodied in one or more computer readable media. The term computer readable medium refers to any data storage device that can store data which can thereafter be input to a computer system; computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD-ROM (Compact Disc-ROM), a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for executing a job comprising a plurality of tasks executed in parallel on a distributed computing application, the method comprising:

generating a list of available hot spare virtual machines (VMs) which are VMs in a powered on state and executing on a first host, wherein the list of available hot spare VMs which are VMs in the powered on state and executing on the first host includes a tenant-specific list of available hot spare VMs associated with a first tenant;

responsive to receiving a request to execute a first task of the plurality of tasks associated with the first tenant on the first host, (i) allocating a first VM, which is a compute VM, from the tenant-specific list of available hot spare VMs which are VMs in the powered on state, executing on the first host, and associated with the first tenant, by moving the first VM from the tenant-specific list of available hot spare VMs to an active list of VMs, and (ii) modifying the first VM to mount a network filesystem shared by VMs executing on the first host and associated with the first tenant; and launching, in the first VM, a container process that executes the first task of the plurality of tasks associated with the first tenant.

2. The method of claim 1, wherein generating the list of available hot spare VMs which are VMs in a powered on state and executing on the first host includes:

provisioning a first plurality of VMs to execute on the first host; and powering on a subset of the first plurality of VMs based on a target pool size.

3. The method of claim 1, further comprising:
generating intermediate output based on execution of the first task, wherein the first task is a Map task; and
storing the intermediate output in the mounted network filesystem associated with the first tenant;
executing a web server configured to access contents stored in the mounted network filesystem including the generated intermediate output;
responsive to a second request to execute a second task of the plurality of tasks, allocating a second VM, which is a compute VM, from the list of available hot spare VMs which are VMs in the powered on state and executing on the first host; and
receiving, by operation of the second VM, the intermediate output results from the web server, wherein the second task is a Reduce Task.

4. The method of claim 1, further comprising:
upon completing execution of the first task on the first VM, moving the first VM from the active list to the list of available hot spare VMs which are VMs in the powered on state and executing on the first host.

5. The method of claim 1, further comprising:
subsequent to execution of the first task on the first VM, performing a reset operation on the first VM that removes tenant-specific state from the first VM; and
moving the first VM from the active list of VMs to a list of available VMs which have been reset subsequent to executing a task.

6. The method of claim 1, further comprising:
responsive to determining the list of available hot spare VMs which are in the powered on state and executing on the first host has less than a target pool size, powering on a second VM of a first plurality of VMs which are powered off and provisioned to execute on the first host based on a deficit of the target pool size; and
adding the second VM to the list of available hot spare VMs which are powered on and executing on the first host.

7. A non-transitory computer-readable storage medium comprising instructions that, when executed in a computing device, execute a job comprising a plurality of tasks executed in parallel on a distributed computing application, by performing the steps of:
generating a list of available hot spare virtual machines (VMs) which are VMs in a powered on state and executing on a first host, wherein the list of available hot spare VMs which are in the powered on state and executing on the first host includes a tenant-specific list of available hot spare VMs associated with a first tenant;
responsive to receiving a request to execute a first task of the plurality of tasks associated with the first tenant on the first host, (i) allocating a first VM, which is a compute VM, from the tenant-specific list of available hot spare VMs which are VMs in a powered on state, executing on the first host, and associated with the first tenant, by moving the first VM from the tenant-specific list of available hot spare VMs to an active list of VMs, and (ii) modifying the first VM to mount a network filesystem shared by VMs executing on the first host and associated with the first tenant; and
launching, in the first VM, a container process that executes the first task of the plurality of tasks associated with the first tenant.

8. The non-transitory computer-readable storage medium of claim 7, wherein the step of generating the list of available hot spare VMs which are VMs in a powered on state and executing on the first host includes:
provisioning a first plurality of VMs to execute on the first host; and
powering on a subset of the first plurality of VMs based on a target pool size.

9. The non-transitory computer-readable storage medium of claim 7, further comprising the steps of:
upon completing execution of the first task on the first VM, moving the first VM from the active list to the list of available hot spare VMs which are VMs in the powered on state and executing on the first host.

10. The non-transitory computer-readable storage medium of claim 7, further comprising the steps of:
subsequent to execution of the first task on the first VM, performing a reset operation on the first VM that removes tenant-specific state from the first VM; and
moving the first VM from the active list of VMs to a list of available VMs which have been reset subsequent to executing a task.

11. The non-transitory computer-readable storage medium of claim 7, further comprising the steps of:
responsive to determining the list of available hot spare VMs which are in the powered on state and executing on the first host has less than a target pool size, powering on a second VM of a first plurality of VMs which are powered off and provisioned to execute on the first host based on a deficit of the target pool size; and
adding the second VM to the list of available hot spare VMs which are powered on and executing on the first host.

12. A computer system having a plurality of hosts executing a plurality of virtual machines (VMs) for executing a job comprising a plurality of tasks executed in parallel on a distributed computing application, the computer system comprising:
a memory; and
a processor programmed to carry out the steps of:
generating a list of available hot spare virtual machines (VMs) which are VMs in a powered on state and executing on a first host, wherein the list of available hot spare VMs which are in the powered on state and executing on the first host includes a tenant-specific list of available hot spare VMs associated with a first tenant;
responsive to receiving a request to execute a first task of the plurality of tasks associated with the first tenant on the first host, (i) allocating a first VM, which is a compute VM, from the tenant-specific list of available hot spare VMs which are VMs in the powered on state, executing on the first host, and associated with the first tenant, by moving the first VM from the tenant-specific list of available hot spare VMs to an active list of VMs, and (ii) modifying the first VM to mount a network filesystem shared by VMs executing on the first host and associated with the first tenant; and
launching, in the first VM, a container process that executes the first task of the plurality of tasks associated with the first tenant.

13. The computer system of claim 12, wherein the processor is further configured to carry out the steps of:
upon completing execution of the first task on the first VM, moving the first VM from the active list of VMs to a list of available hot spare VMs which are VMs in the powered on state, and executing on the first host.

14. The method of claim 3, wherein the second VM is allocated from the tenant-specific list of available hot spare VMs.

15. The method of claim 4, wherein the first VM is moved from the active list to the tenant specific list of available hot spare VMs.

16. The method of claim 9, wherein the first VM is moved from the active list to the tenant specific list of available hot spare VMs.

17. The method of claim 13, wherein the first VM is moved from the active list to the tenant specific list of available hot spare VMs.

* * * * *